J. Armstrong, Jr.

Sheet 1, 2 Sheets.

Cultivator.

No. 3,348. Reissued Mar. 30, 1869.

Witnesses;
R. S. Hampson
Geo. Phelps

Inventor;
Jas. Armstrong Jr.
by his atty.
Mason, Fenwick & Lawrence

Sheet 2
2 Sheets.

J. Armstrong, Jr.

Cultivator.

No. 3,348. Reissued Mar. 30, 1869.

Witnesses:
R. T. Campbell
Edw. Schafer.

Inventor:
Jas. Armstrong Jr.
by his Atty.
Mason, Fenwick & Lawrence

UNITED STATES PATENT OFFICE.

JAMES ARMSTRONG, JR., OF ELMIRA, ILLINOIS.

IMPROVEMENT IN CULTIVATORS.

Specification forming part of Letters Patent No. 51,680 dated December 26, 1865; Reissue No. 3,348, dated March 30, 1869.

*To all whom it may concern:*

Be it known that I, JAMES ARMSTRONG, Jr., of Elmira, in the county of Stark and State of Illinois, have invented a new and Improved Cultivator; and I do hereby declare that the following is a full, clear, and exact description thereof, reference being had to the accompanying drawings, making a part of this specification, in which—

Figure 1:
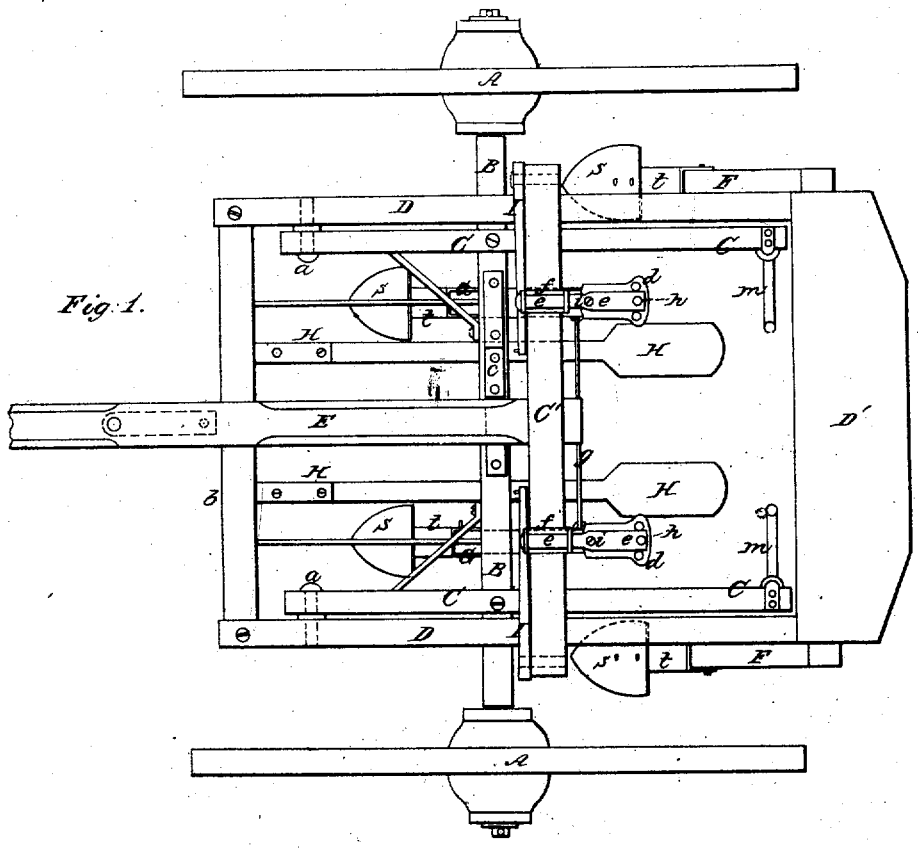
Figure 2:
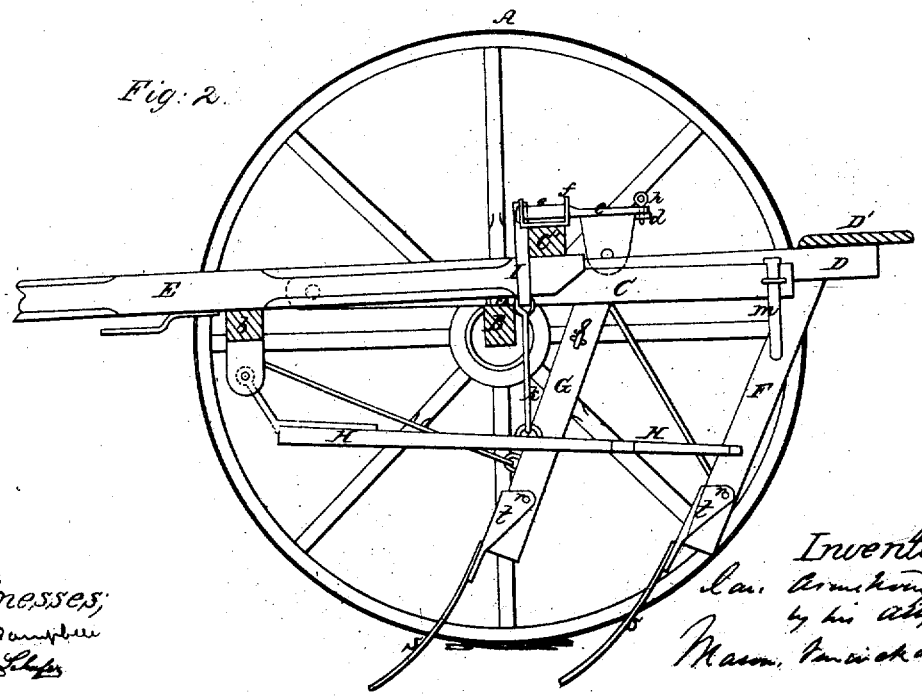
Figure 3:
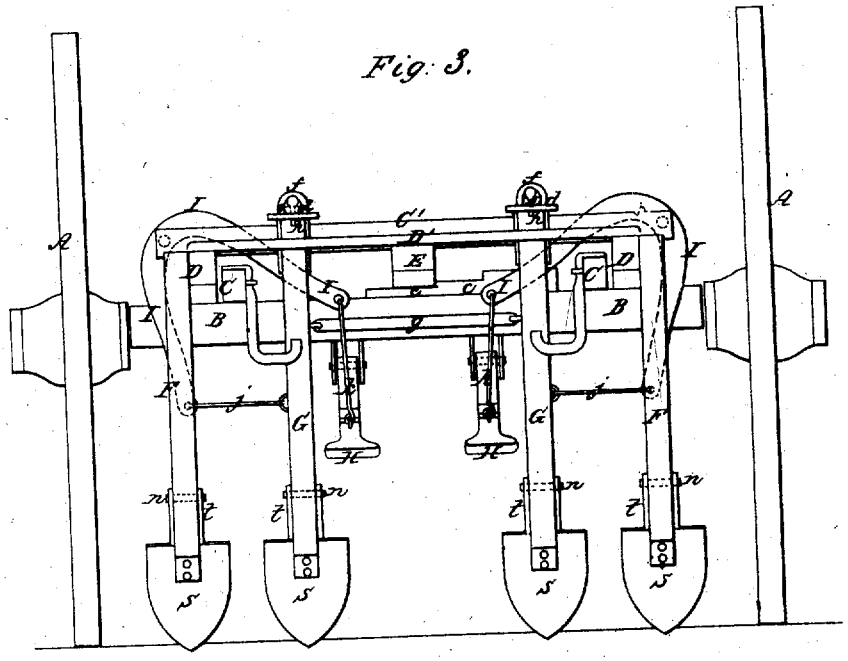
Figure 5:
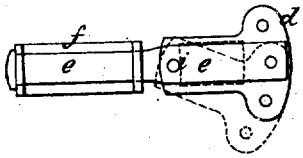
Figure 4:
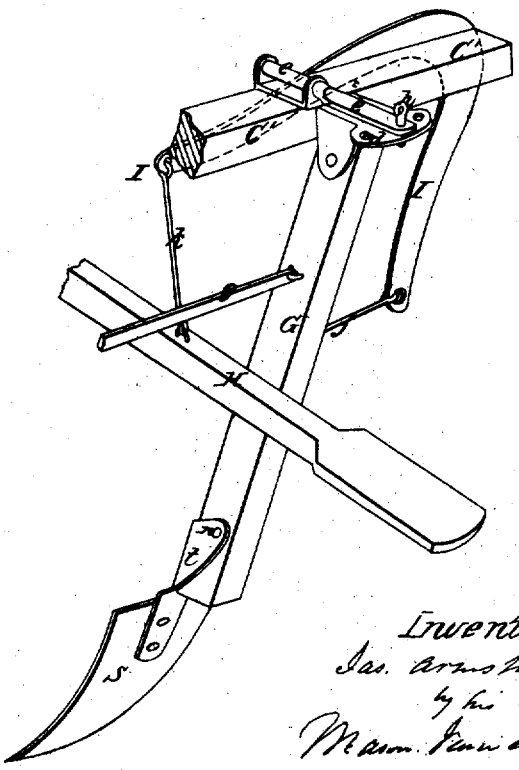
Figure 6:
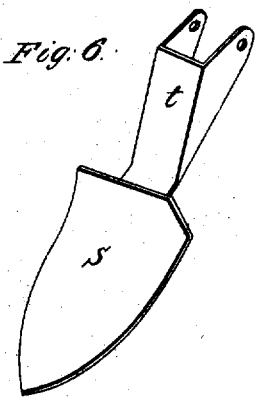

Figure 1, Sheet 1, is a plan view of my improved cultivator. Fig. 2, Sheet 1, is a longitudinal section, taken in a vertical plane through the cultivator. Fig. 3, Sheet 2, is a rear end elevation of the machine. Fig. 4, Sheet 2, is a perspective view, showing the mode of attaching one of the treadles to one of the shovel-standards. Fig. 5, Sheet 2, is a top view, showing the mode of attaching and adjusting one of the swinging shovel-standards. Fig. 6, Sheet 2, is a perspective view of one of the shovels and its attaching-iron.

Similar letters of reference indicate corresponding parts in the several figures.

This invention relates to certain novel improvements on two-wheeled cultivators, which are more particularly designed for cultivating corn and finishing the rows by once passing over them. My object is to enable the attendant to ride upon a seat which is located in rear of the axle of two transporting-wheels, and in rear of the shovels, which seat is applied upon an articulating frame that extends both forward and in rear of the axle of said wheels, and serves as a means by which to support shovel-carrying standards arranged in rear of said axle, substantially as will be hereinafter explained, whereby a person riding upon the machine can always have the shovels in sight to inspect the work, and can also employ a leverage together with his own weight to advantage, for raising the shovels free from the ground, as will be hereinafter explained; also, to enable the attendant, while riding upon a rear extension of a frame, which can articulate about the axis of the transporting-wheels, to conveniently control the lateral movements of those shovels which are nearest the plants by means of his feet, for the purpose of guiding these shovels along irregular rows of plants, as will be hereinafter explained; also, to provide for pivoting those shovel-standards which are nearest the plants to a part of the frame of the cultivator, in such manner that these shovels can be adjusted and set so that they will either throw the earth about the roots of the plants, or throw it from the plants, as may be required, as will be hereinafter set forth; also, to provide for adjusting the frame of the machine higher or lower upon its axle, and supporting such frame at different heights thereon for the purpose of regulating the depths which is is desired the shovels should run in the ground when in working position, as will be hereinafter explained.

To enable others skilled in the art to understand my invention, I will describe the best means known to me of carrying it into effect.

In the accompanying drawings, A A represent two transporting-wheels, which turn loosely upon the ends of axle B.

C C are two longitudinal beams, which are secured rigidly to the axle B at an equal distance on each side of its center, and extend forward and in rear of the axle any required distance.

D D are two beams, which are somewhat longer than the beams C C, and which are arranged outside of the latter, and pivoted to them at *a a* by means of horizontal transverse pins, as shown in Fig. 1. The forward ends of the two longitudinal beams D D are connected together by transverse brace *b*, and the rear ends of these beams D D are connected together by a transverse board, D′, which is adapted to serve as a support for the driver or attendant, to allow him to ride upon said beams D D in rear of the axle B. At an intermediate point between the two transverse pieces *b* and D′, and slightly in rear of the axle B, is a transverse brace, C′, to which, and also to the front brace, *b*, the draft-pole is rigidly secured, as shown in Figs. 1 and 2. The two longitudinal beams D D and their cross-braces *b* C′ constitute the supporting-frame for the shovel-standards, which are four in number—to wit, two outer standards, F F, which are rigidly secured to the rear ends of said beams, and two inner standards, G G, which are connected by pivot-joints to the intermediate cross-bar, C′—as will be hereinafter explained.

The longitudinal draft-pole E rests upon a stepped block, *c*, when the shovels are in working position, as shown in the drawings, Figs. 1, 2, and 3, which block *c* is secured upon the axle B in any suitable manner which will admit of any one of the stepped surfaces being adjusted beneath the draft-pole, so that the shovel-carrying frame may be sustained at any desired height above the axle by its draft-pole resting upon one or the other elevations of the stepped block. By means of this adjustable block *c* the frame of the machine can be set so that the plows or shovels may be made to run deeper or shallower in the ground, as may be required.

On the upper ends of the shovel-standards G G perforated segments *d d* are secured, which are formed on the rear parts of caps that have ears formed on them to receive and secure in place said standards. These caps are pivoted at *i i* to longitudinal rods *e e*, the forward ends of which are pivoted to bearings *f f* on the cross-bar C′, as shown in Figs. 1, 2, and 5. These rods *e e* allow the lower ends of the two standards G G, which are connected by a cross-bar, *g*, to vibrate laterally, and the vertical or nearly-vertical joints at *i i* allow said standards to be turned either to the right or to the left, as occasion may require. An outward direction or an inward direction may be given to the shovels on the standards G G by adjusting them about the pivots *i i*, and they may be fixed in either of such positions by the pins *h h*, which pass through the ends of the rods *e e* and through the perforations made through the segments *d d*.

The standards G G, which carry the shovels intended to work nearest the plants, are connected to treadles H H by means of rods *j j*, curved levers I I, and connecting-rods *k k*, so that by depressing either one of the treadles H the lower ends of the standards G G will be moved in an exactly opposite direction. The levers I I are pivoted to the front side of the cross-bar C′, and curve over the longitudinal beams of the main supporting-frame, as shown in Figs. 3 and 4. The two treadles H H are pivoted to hangers beneath the front cross-brace, *b*, and these treadles extend back beneath the axle B a sufficient distance in rear of the same to be convenient for the attendant to operate them with his feet while sitting upon the seat D′.

The rear ends of the longitudinal beams C C are carried out in rear of the axle B a suitable distance, and are provided on these ends with stirrups *m m*, upon which the attendant places his feet when he desires to elevate the shovel-carrying frame and thus lift the shovels from the ground.

Each one of the standards carries a shovel, S, which is bolted to a casting, *t*, that has two wings formed on it, which wings embrace a standard near its lower end, and receive through them transversely a pivot, *n*. By thus connecting the shovels to their standards, it will be seen that the shovels will remain stiff while the machine is advancing; but when the machine is backed or turned, these shovels will swing forward on their pivots *n*, instead of being bent or broken. When the attendant desires to raise the shovels free from the ground, he removes his weight from the shovel-carrying frame and applies it to the rear ends of levers C C, to depress these ends, and as the front ends of these levers are pivoted to the shovel-carrying frame in front of the axle B, and these levers have their fulcra upon this axle, it is obvious that the rear part of the said frame, with its shovels, will be lifted in proportion to the distance the rear ends of the levers C are depressed. Under this arrangement the rear end of the draft-pole E will be raised at the same time the shovels are raised.

It will be seen from the above description that I employ two pair of longitudinal beams, arranged across the axle of two transporting-wheels, and extending both forward and in rear of said axle; also, that the rear ends of one pair of said beams serve to support the driver's seat in rear of the axle and shovels, while the front ends of this pair serve as a means for connecting the other pair of beams by pivots to them in front of the axle; also, that one pair of beams carries the shovels, while the other pair affords a leverage, (the axle B being the fulcrum,) to enable the driver to employ the weight or power of his body to raise the shovels free from the ground.

I do not confine my invention to the precise arrangement of parts herein described, whereby the attendant while located upon the machine in rear of the axle can elevate the shovels free from the ground by employing both his muscular force and weight of his body, as other means equivalent thereto may be adopted for effecting the same result.

What I claim as new, and desire to secure by Letters Patent, is—

1. Two longitudinal beams or levers, C C, extending both in front and in rear of the axle B of a cultivator, and secured rigidly upon said axle at any required distance on each side of its center, said beams or levers being pivoted or hinged at their forward ends to the shovel-carrying frame D D, substantially as described.

2. The beams or levers C C, applied to the axle of a cultivator, and extending both in front and in rear of said axle, so that when their rear ends are depressed the shovel-carrying frame is raised, substantially as described.

3. Rigidly securing the draft-pole E to the transverse brace C′ and front brace, *b*, of a shovel-carrying frame of a carriage-cultivator, when such frame is hinged at its front end, and it, together with the rear end of the draft-pole and with said braces, rises bodily as the cultivator-teeth are elevated, substantially as described.

4. Pivoting the inner shovel-standards, G G, to a transverse brace, C′, of a shovel-carrying frame, which is hinged at its front end and has the draft-pole attached to it, substantially as described.

5. A carriage-cultivator combining in its organization two pairs of longitudinal beams hinged or pivoted together at their front ends, or levers D D C C, and a driver's seat located on extensions which are above the axle, in rear of the axle of the transporting-wheels and in rear of the plows or shovels, substantially as described.

6. The shovel-carrying frame D D, with the driver's seat D′ secured to its rear end, said frame being pivoted by its forward ends to two levers, which are secured rigidly to the carriage-axle B, and are provided with foot-stirrups *m m*, substantially in the manner and for the purpose described.

7. The movable stepped block *c*, applied to the axle B of a cultivator-carriage, for adjusting the shovel-frame of a cultivator, substantially in the manner herein described.

8. The longitudinal laterally-rocking rods *e e*, in combination with the pivoted cap *d*, applied in a cultivator, substantially in the manner and for the purpose herein described.

9. The compound pivot-joint *e i*, for connecting the shovel-standards G G to their supporting-frame, and allowing the lateral vibration of the standards, as well as permitting the desired adjustment of the same either to the right or left, substantially in the manner described.

10. Constructing the shovels *s* with an embracing-extension, *t*, which is pivoted to the standard in the manner described and represented, for the purpose set forth.

11. The combination of the shovel-frame D D C′, with the levers C C, vibrating standards G G, curved levers I I, and treadles H H, substantially as described.

JAMES ARMSTRONG, JR.

Witnesses:

JAMES H. MILLER,
ROBERT ARMSTRONG.